United States Patent
Onitsuka

(10) Patent No.: US 11,200,013 B2
(45) Date of Patent: Dec. 14, 2021

(54) INFORMATION PROCESSING DEVICE TO DISPLAY SCREEN FOR CORRECTING SETTING TO TROUBLESHOOT AND NON-TRANSITORY COMPUTER READABLE RECORDING MEDIUM

(71) Applicant: FUJIFILM Business Innovation Corp., Tokyo (JP)

(72) Inventor: Miki Onitsuka, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 263 days.

(21) Appl. No.: 16/208,567

(22) Filed: Dec. 4, 2018

(65) Prior Publication Data

US 2019/0278540 A1 Sep. 12, 2019

(30) Foreign Application Priority Data

Mar. 7, 2018 (JP) .............................. JP2018-041151

(51) Int. Cl.
*G06F 3/12* (2006.01)
*H04N 1/00* (2006.01)

(52) U.S. Cl.
CPC .......... *G06F 3/1238* (2013.01); *G06F 3/1222* (2013.01); *H04N 1/00076* (2013.01); *H04N 1/00408* (2013.01)

(58) Field of Classification Search
None
See application file for complete search history.

(56) References Cited

U.S. PATENT DOCUMENTS

| 6,338,149 | B1* | 1/2002 | Ciccone, Jr. | ......... G06F 11/2289 714/38.12 |
| 7,519,302 | B2 | 4/2009 | Matsuhara | |
| 9,041,945 | B2 | 5/2015 | Sato | |
| 2011/0131295 | A1* | 6/2011 | Jolfaei | .................. G06F 11/366 709/219 |

FOREIGN PATENT DOCUMENTS

| JP | 2004128665 | 4/2004 |
| JP | 3952064 | 8/2007 |
| JP | 2012234273 | 11/2012 |
| JP | 2013135414 | 7/2013 |

* cited by examiner

*Primary Examiner* — Thomas D Lee
(74) *Attorney, Agent, or Firm* — JCIPRNET

(57) ABSTRACT

An information processing device includes a controller that causes a display to display a screen for correcting a setting to troubleshoot according to a right of a user when a predetermined process to be executed fails.

10 Claims, 11 Drawing Sheets

| ERROR CODE | TROUBLESHOOTING ITEM | GENERAL USER | ADMINISTRATOR |
|---|---|---|---|
| aaaa | USER NAME | Y | N |
| | PASSWORD | Y | N |
| bbbb | SHARE NAME | Y | Y |
| cccc | SAVE LOCATION (PATH) | Y | Y |
| dddd | DNS SERVER | N | Y |
| eeee | IP MODE (IPv4/v6) | N | Y |
| ffff | AUTHENTICATION METHOD (SUCH AS NTLMv2) | N | Y |
| ... | ... | ... | ... |

FIG. 9

SELECT AN ITEM AND PRESS [CHECK/CHANGE].       👤 DEVICE ADMINISTRATOR

3. TCP/IP-NETWORK SETTINGS    ( CLOSE )

| SETTING | CURRENT VALUE |
|---|---|
| 1. IPv4-IP ADDRESS ACQUISITION METHOD | ACQUIRE FROM DHCP/AutoIP |
| 2. IPv4-IP ADDRESS | DHCP (172.27.67.185) |
| 3. IPv4-SUBNET MASK | DHCP (255.255.255.0) |
| 4. IPv4-GATEWAY ADDRESS | DHCP (172.27.67.1) |
| 5. IPv4-DNS SETTINGS | — |
| 6. IPv4-IP FILTERING | NOT SET |
| 7. IPv6-MANUAL ADDRESS SETTINGS | NOT SET |

PAGE ◀ 1/2 ▶    ( CHECK/CHANGE )

16D, 16, 67

INFORMATION PROCESSING DEVICE TO DISPLAY SCREEN FOR CORRECTING SETTING TO TROUBLESHOOT AND NON-TRANSITORY COMPUTER READABLE RECORDING MEDIUM

CROSS-REFERENCE TO RELATED APPLICATIONS

This application is based and claims priority under 35 USC 119 from Japanese Patent Application No. 2018-041151 filed Mar. 7, 2018.

BACKGROUND

Technical Field

The present invention relates to an information processing device and a non-transitory computer readable recording medium.

SUMMARY

According to an aspect of the invention, there is provided an information processing device including a controller that causes a display to display a screen for correcting a setting to troubleshoot according to a right of a user when a predetermined process to be executed fails.

BRIEF DESCRIPTION OF THE DRAWINGS

Exemplary embodiments of the present invention will be described in detail based on the following figures, wherein:

FIG. 9 is a front view illustrating an example of a settings screen for an administrator according to an exemplary embodiment;

DETAILED DESCRIPTION

Hereinafter, examples of embodiments for carrying out the present invention will be described in detail and with reference to the drawings.

First Exemplary Embodiment

Figure 1:
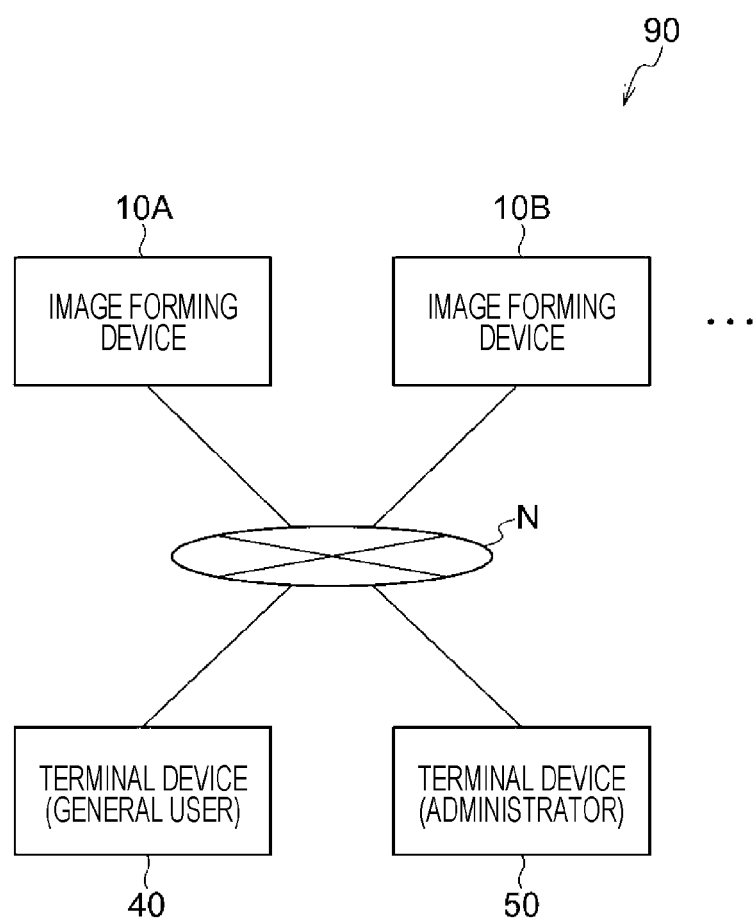
FIG. 1 is a block diagram illustrating an example of a configuration of a network system according to the first exemplary embodiment.

FIG. 1 is a block diagram illustrating an example of a configuration of a network system 90 according to the first exemplary embodiment.

As illustrated in FIG. 1, the network system 90 according to the present exemplary embodiment is provided with multiple image forming devices 10A, 10B, and so on, a terminal device 40, and a terminal device 50.

Note that although the present exemplary embodiment is described by taking an example in which there are multiple image forming devices 10A, 10B, and so on, there may also be a single image forming device. Also, in cases where it is not necessary to individually distinguish the image forming devices 10A, 10B, and so on, the image forming devices 10A, 10B, and so on will also be referred to collectively as the image forming device 10.

The image forming device 10 according to the present exemplary embodiment is an example of an information processing device, and is connected to each of the terminal device 40 and the terminal device 50 via a network N. Note that the Internet, a local area network (LAN), a wide area network (WAN), and the like are applied as examples of the network N. Also, regarding the above information processing device, instead of the image forming device 10, another device in which user rights may be set, such as a computer like a server computer or a personal computer (PC), an image reading device, or the like may also be applied.

Each of the terminal device 40 and the terminal device 50 according to the present exemplary embodiment may be, for example, a general-purpose computer such as a personal computer, a portable terminal device such as a smartphone or tablet, or the like. The terminal device 40 is a device used by a general user who does not have administrator rights, and driver software for causing the image forming device 10 to execute various process is installed in the terminal device 40. On the other hand, the terminal device 50 is a device used by an administrator who has administrator rights, and similarly to the terminal device 40, driver software for causing the image forming device 10 to execute various process is installed in the terminal device 50. Note that the term administrator herein means the administrator of the network system 90, and is also called the system administrator. Note that the administrator may also include a system engineer or the like, for example.

Figure 2:
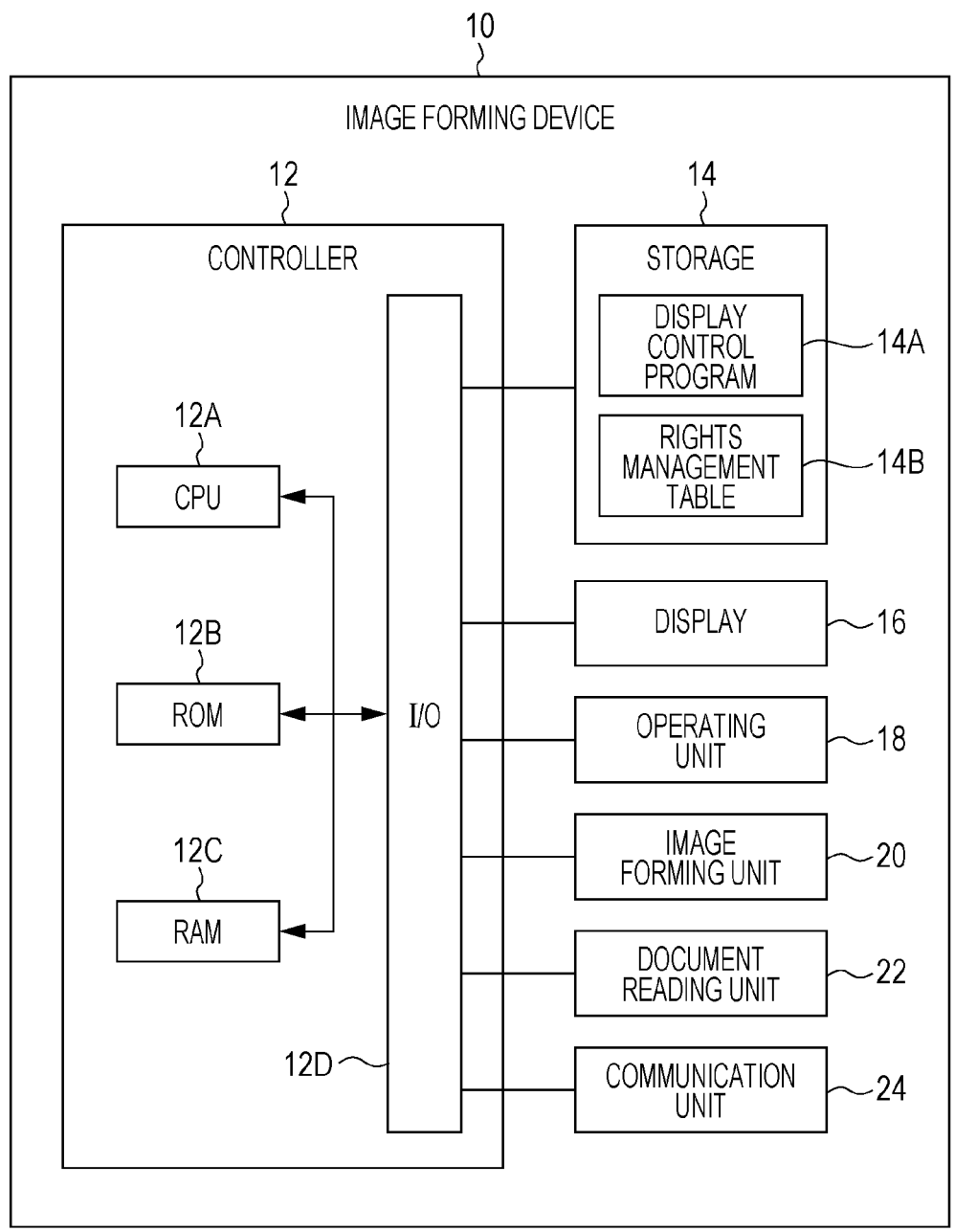
FIG. 2 is a block diagram illustrating an example of an electrical configuration of an image forming device according to the first exemplary embodiment.

FIG. 2 is a block diagram illustrating an example of an electrical configuration of the image forming device 10 according to the first exemplary embodiment.

As illustrated in FIG. 2, the image forming device 10 according to the present exemplary embodiment is provided with a controller 12, storage 14, a display 16, an operating unit 18, an image forming unit 20, a document reading unit 22, and a communication unit 24.

The controller 12 is provided with a central processing unit (CPU) 12A, read-only memory (ROM) 12B, random access memory (RAM) 12C, and an input/output (I/O) interface 12D. These components are interconnected via a bus.

Each functional unit, including the storage 14, the display 16, the operating unit 18, the image forming unit 20, the document reading unit 22, and the communication unit 24, is connected to the I/O 12D. Each of these functional units is capable of bidirectional communication with the CPU 12A via the I/O 12D.

The controller 12 may be configured as a sub-controller that controls a subset of operations of the image forming device 10, or may be configured as a main controller that controls all operations of the image forming device 10. An integrated circuit such as a large-scale integration (LSI) chip or an integrated circuit (IC) chipset, for example, is used for some or all of the blocks of the controller 12. A discrete circuit may be used for each of the above blocks, or a circuit integrating some or all of the above blocks may be used. The above blocks may be provided together as a single body, or some blocks may be provided separately. Also, a part of each of the above blocks may be provided separately. The integration of the controller 12 is not limited to LSI, and a dedicated circuit or a general-purpose processor may also be used.

For the storage 14, a hard disk drive (HDD), a solid-state drive (SSD), flash memory, or the like is used, for example. The storage 14 stores a display control program 14A according to the present exemplary embodiment. Note that the display control program 14A may also be stored in the ROM 12B. Also, a rights management table 14B described later is stored in the storage 14. The rights management table 14B may also be stored in the ROM 12B.

The display control program 14A may be preinstalled in the image forming device 10, for example. The display control program 14A may also be realized by being stored on a non-volatile storage medium or distributed over a network, and appropriately installed in the image forming device 10. Note that anticipated examples of the non-volatile storage medium include a Compact Disc-Read-Only Memory (CD-ROM), a magneto-optical disc, an HDD, a Digital Versatile Disc-Read-Only Memory (DVD-ROM), flash memory, a memory card, and the like.

For the display 16, for example, a liquid crystal display (LCD), an organic electroluminescence (EL) display, or the like is used. The display 16 includes an integrated touch panel. On the operating unit 18, various operating keys such as a keypad and a Start key are provided. The display 16 and the operating unit 18 accept various instructions from a user of the image forming device 10. The various instructions include, for example, an instruction to start reading a document, an instruction to start copying a document, and the like. The display 16 displays various information such as the results of processes executed in accordance with instructions received from the user, notifications about processes, and the like.

The document reading unit 22 takes in one page at a time of a document placed on a paper feed tray of an automatic document feeder (not illustrated) provided on the top of the image forming device 10, and optically reads the taken-in document to obtain image information. Alternatively, the document reading unit 22 optically reads a document placed on a document bed such as a platen glass to obtain image information. The document reading unit 22 is an example of a reader.

The image forming unit 20 forms, on a recording medium such as paper, an image based on image information obtained by the reading by the document reading unit 22, or image information obtained from an external PC or the like connected via the network N. Note that although the present exemplary embodiment is described by taking an electrophotographic system as an example of the system of forming images, but another system, such as an inkjet system, may also be adopted.

In the case in which the system of forming images is an electrophotographic system, the image forming unit 20 includes a photoreceptor drum, a charger, an exposure unit, a developer, a transfer unit, and a fuser. The charger applies a voltage to the photoreceptor drum to charge the surface of the photoreceptor drum. The exposure unit forms an electrostatic latent image on the photoreceptor drum by exposing the photoreceptor drum charged by the charger with light corresponding to the image information. The developer forms a toner image on the photoreceptor drum by developing with toner the electrostatic latent image formed on the photoreceptor drum. The transfer unit transfers the toner image formed on the photoreceptor drum onto a recording medium. The fuser fuses the transferred toner image to the recording medium with heat and pressure.

The communication unit 24 is connected to the network N, and is able to communicate with the terminal device 40, the terminal device 50, and other image forming devices 10 over the network N. In the case of this example, the communication unit 24 and the network N are connected in a wired manner, but may also be connected in a wireless manner. The communication unit 24 is an example of a forwarder, and on the basis of an instruction from the CPU 12A, forwards image information obtained by the document reading unit 22 reading a document to a destination specified in advance. As the destination, either the terminal device 40 or the terminal device 50 is specified, for example.

By the way, in an image forming device of this type, as described above, only an error code is displayed when an error occurs, whereas detailed information about the error is found on a homepage, in a manual, or the like. On the homepage, in the manual, or the like, several methods of troubleshooting the error code are described, but in some cases it is difficult for a general user to decide which troubleshooting method is appropriate.

Figures 3, 4:
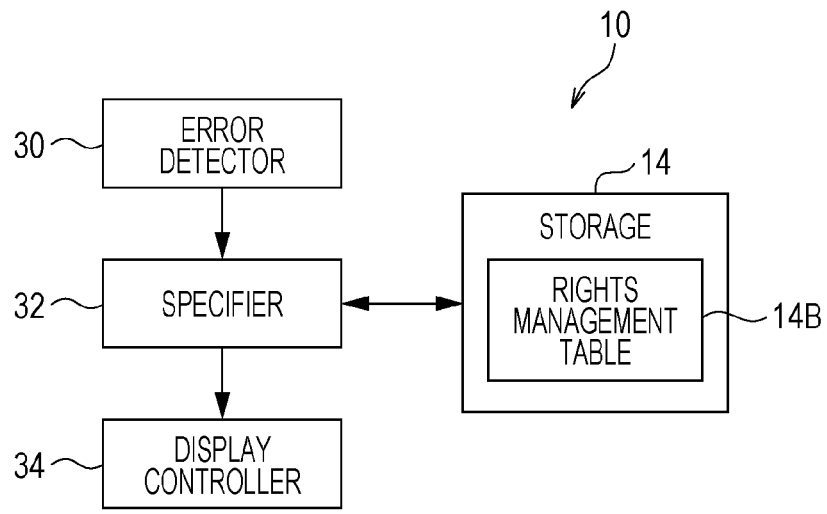
FIG. 3 is a block diagram illustrating an example of a functional configuration of the image forming device according to the first exemplary embodiment.
FIG. 4 is a diagram illustrating an example of a rights management table according to an exemplary embodiment.

For this reason, by loading the display control program 14A stored in the storage 14 into the RAM 12C, and executing the display control program 14A, the CPU 12A of the image forming device 10 according to the present exemplary embodiment functions as each component illustrated in FIG. 3.

FIG. 3 is a block diagram illustrating an example of a functional configuration of the image forming device 10 according to the first exemplary embodiment.

As illustrated in FIG. 3, the CPU 12A of the image forming device 10 according to the present exemplary embodiment functions as an error detector 30, a specifier 32, and a display controller 34. The display controller 34 is an example of a controller.

The error detector 30 according to the present exemplary embodiment detects whether or not a predetermined process that the image forming device 10 has been instructed to execute has failed. Specifically, the error detector 30 detects whether or not an error has occurred during the execution of the predetermined process. Note that the term "failure" according to the present exemplary embodiment means a failure that produces an error code. In the present exemplary embodiment, the case of application to a situation in which an error occurs is described as an example of a process failing, but the present exemplary embodiment is not limited thereto. Also, in the present exemplary embodiment, a case is described in which a process of forwarding image information obtained by the document reading unit 22 reading a document to a destination specified in advance (herein, the terminal device 40 or the terminal device 50), also called a Scan to SMB (Server Message Block) process, is applied as an example of the above predetermined process, but another process of forwarding an image, such as a Scan to FTP (File Transfer Protocol) process may also be applied. Hereinafter, in the present exemplary embodiment, these processes are collectively designated an "image forwarding process", but the above predetermined process is not limited to the "image forwarding process", and the whole range of processes executed by the image forming device 10 may be targeted.

When the error detector 30 detects that an error has occurred during the execution of the image forwarding process, the specifier 32 according to the present exemplary embodiment specifies a setting to troubleshoot depending on the user's rights. The user's rights refer to, for example, the rights of a general user who does not have the administrator rights described above, or the rights of an administrator who has administrator rights. As an example, the user's rights are specified from a user identification (ID), which is an example of identification information for the user which is input when the user logs in to the image forming device 10.

Next, FIG. 4 will be referenced to describe a specific operation by which the specifier 32 specifies a setting to troubleshoot.

FIG. 4 is a diagram illustrating an example of the rights management table 14B according to the present exemplary embodiment.

As illustrated in FIG. 4, in the rights management table 14B according to the present exemplary embodiment, correspondence relationship information indicating a correspondence relationship between the user's rights and a setting to troubleshoot (in the example of FIG. 4, a troubleshooting item) is stored.

In this case, the specifier 32 specifies, from the user ID, whether the user who gave the instruction to execute the image forwarding process has general user rights or administrator rights. Subsequently, as an example, the specifier 32 acquires an error code from log information about the image forwarding process, and uses the rights management table 14B illustrated in FIG. 14 to specify a setting corresponding to the acquired error code. Herein, log information refers to information including error codes that indicate the content of errors occurring during the execution of processes in the image forming device 10. As an example, if the error code is "aaaa", "user name" and "password" are specified as the settings to troubleshoot. Additionally, if the user has general user rights, it is specified from the rights management table 14B illustrated in FIG. 4 that the "user name" and "password" are settings that a general user is able to troubleshoot, but an administrator is unable to troubleshoot. On the other hand, if the error code is "dddd", the "Domain Name System (DNS) server" is specified as the setting to troubleshoot. Additionally, if the user has general user rights, it is specified from the rights management table 14B illustrated in FIG. 4 that the "DNS server" is a setting that a general user is unable to troubleshoot, or in other words, a setting that is to be troubleshooted by contacting an administrator for help.

Figure 6:
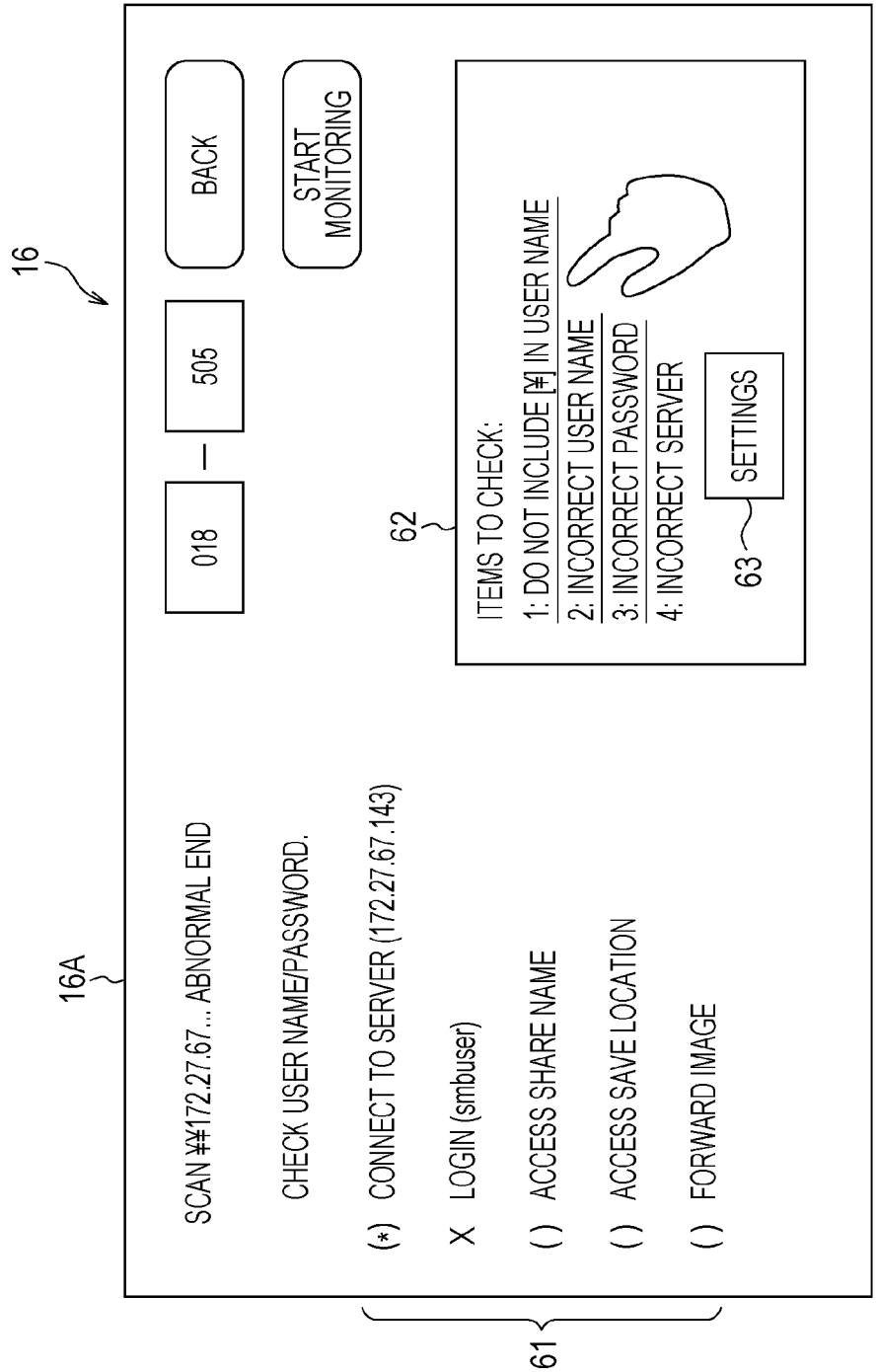
FIG. 6 is a front view illustrating an example of a confirmation screen according to an exemplary embodiment.
Figure 7:
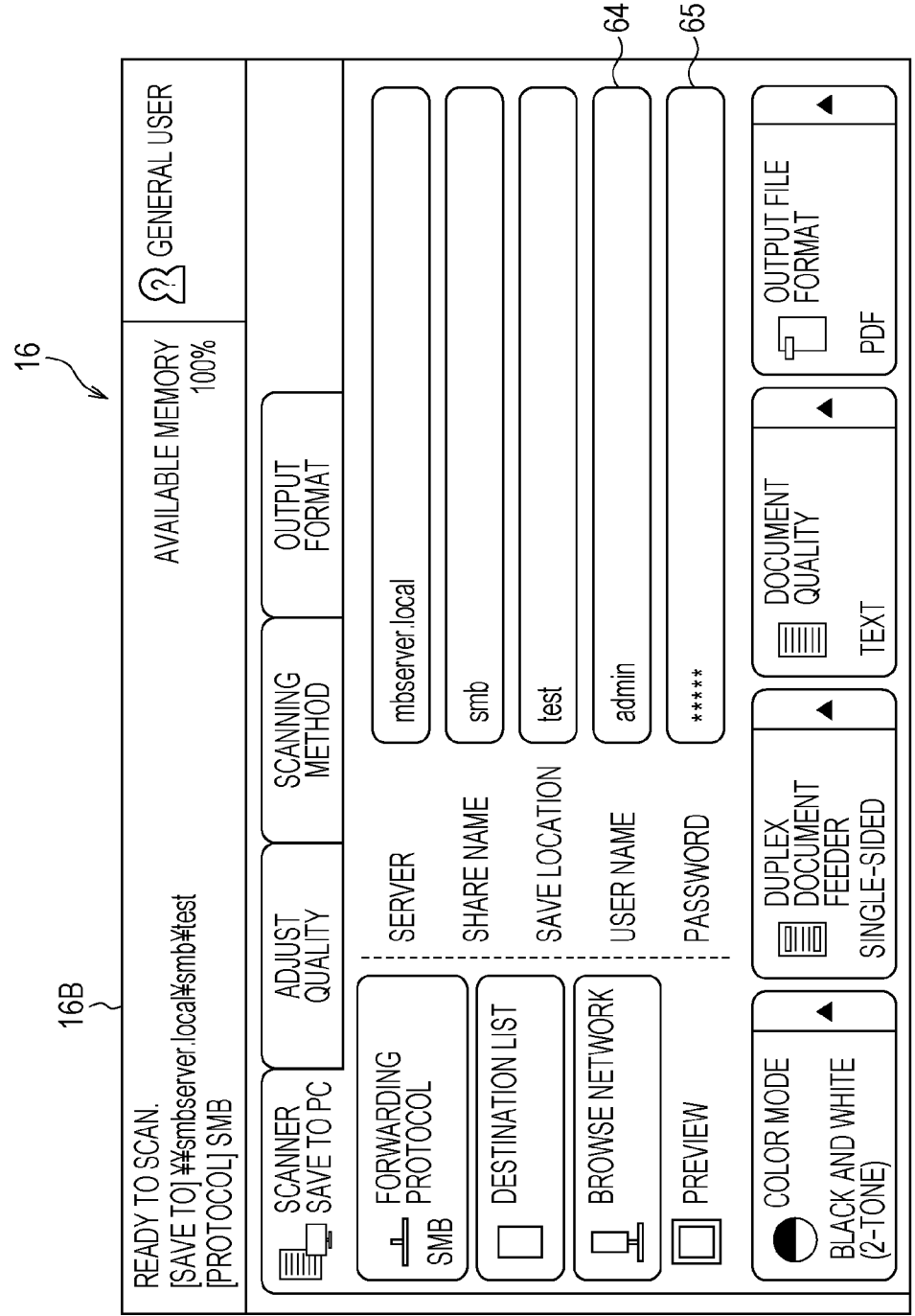
FIG. 7 is a front view illustrating an example of a settings screen for a general user according to an exemplary embodiment.
Figure 8:
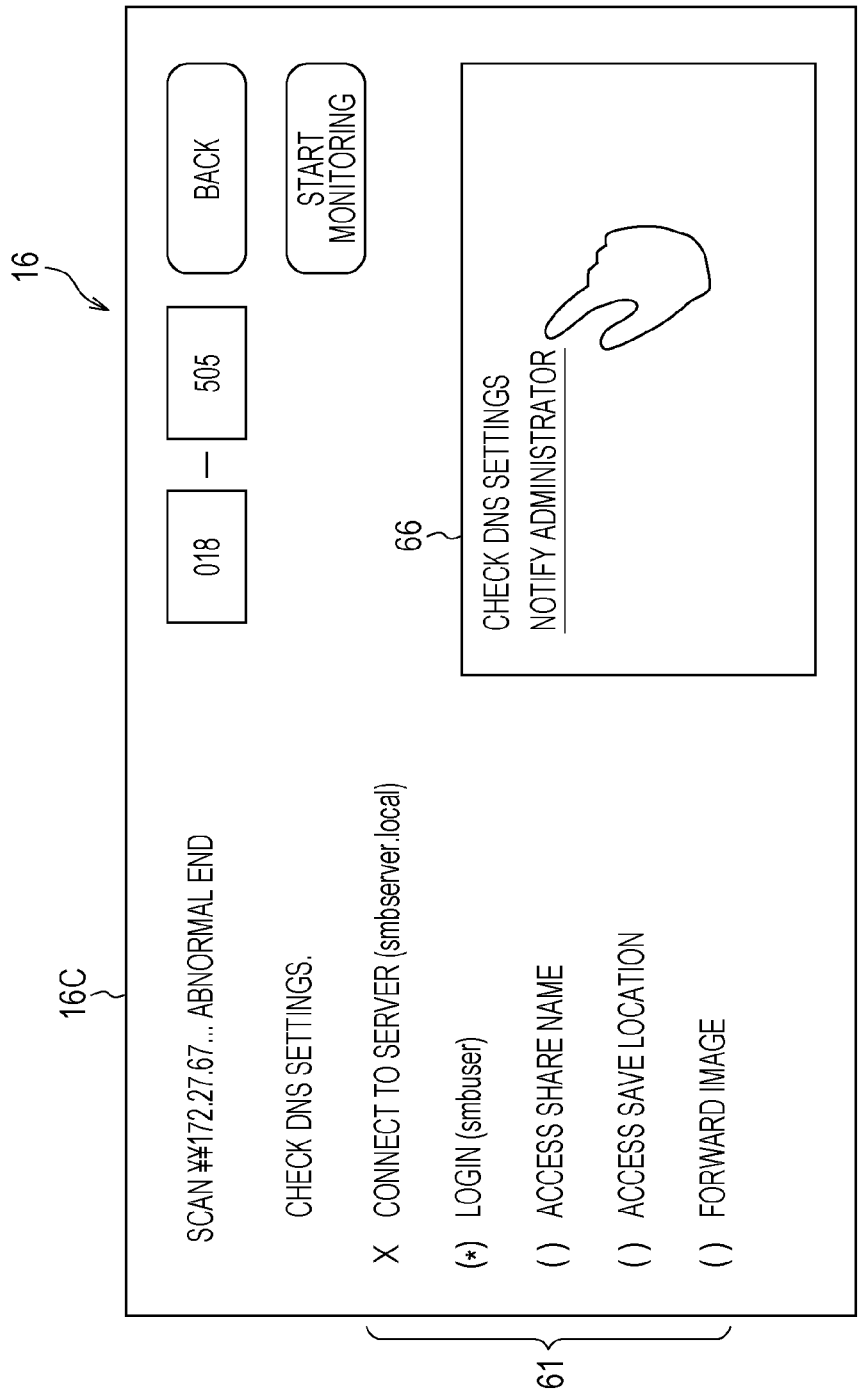
FIG. 8 is a front view illustrating an example of a confirmation screen according to an exemplary embodiment.

The display controller 34 according to the present exemplary embodiment controls the display 16 to display a screen for correcting the item to troubleshoot specified by the specifier 32. For example, if the user has general user rights and the setting is one that a general user is able to troubleshoot, the display 16 is made to display a screen for correcting the setting. Examples of screens for a general user are illustrated in FIGS. 6 and 7 described later. On the other hand, if the user has general user rights and the setting is one that a general user is unable to troubleshoot, the display 16 is made to display a message prompting the user to contact an administrator for troubleshooting. An example of the message is illustrated in FIG. 8 described later. Note that in the present exemplary embodiment, in the case in which the user has administrator rights and the setting is one that an administrator is able to troubleshoot, the display 16 is made to display a screen for correcting the setting. An example of a screen for an administrator is illustrated in FIG. 9 described later.

Also, in the case in which there are multiple items to troubleshoot, the display controller 34 may also cause the display 16 to prioritize the display of a setting having a high probability of resolving the issue as the setting to troubleshoot, on the basis of history information related to errors in the image forwarding process. Herein, the history information refers to information indicating a history of operations of the image forming device 10. In other words, in the case in which an error similar to errors in the past occurs in the image forwarding process, which settings were corrected in the past may be learned from the history information. Therefore, for example, a setting with a high correction frequency is treated as a setting having a high probability of resolving the issue, and is prioritized for display.

Also, although the above uses log information about the image forwarding process to specify the setting to troubleshoot, in the case in which there are multiple image forming devices 10, the setting to troubleshoot may also be specified from differences in the content of the settings in each of the device itself (herein, the image forming device 10A) and another image forming device (herein, the image forming device 10B).

Specifically, in the case in which the device itself and the image forming device 10B are able to communicate, the specifier 32 specifies a setting whose content is different between the device itself and the image forming device 10B. In other words, the device itself acquires, from the image forming device 10B, the content of settings in the image forming device 10B which correspond to settings in the device itself, compares the acquired content of the settings in the image forming device 10B to the content of the settings in the device itself, and specifies a setting whose content is different as the setting to troubleshoot. Subsequently, the display controller 34 controls the display 16 to display a screen for correcting the item to troubleshoot specified by the specifier 32. Note that whether or not the device itself and the image forming device 10B are able to communicate is determined using well-established techniques. Also, in the case in which the device itself is unable to detect a setting whose content is different, there is a possibility that the content of a setting is also incorrect in the image forming device 10B as well, and therefore it is desirable to display a message notifying the user of the situation.

Also, in the case in which the device itself and the image forming device 10B are able to communicate and the image forming device 10B is capable of executing the image forwarding process, the specifier 32 may also specify a setting whose content is different between the device itself and the image forming device 10B. In this case, similarly to the above, the display controller 34 controls the display 16 to display a screen for correcting the item to troubleshoot specified by the specifier 32. Note that whether or not the image forming device 10B is capable of executing the image forwarding process is determined by the following technique, for example. According to this technique, destination information is forwarded from the device itself to the image forming device 10B, and predetermined test data is made to be transmitted from the image forming device 10B to the destination specified by the forwarded destination information, such as the terminal device 40 for example. The result of the transmission of the test data is reported in a notification from the image forming device 10B to the device itself. On the basis of the reported transmission result, in the case in which the test data has been transmitted successfully, the device itself determines that the image forming device 10B is capable of executing the image forwarding process, whereas in the case in which the test data has not been transmitted successfully, the device itself determines that the image forming device 10B is incapable of executing the image forwarding process.

Figure 5:
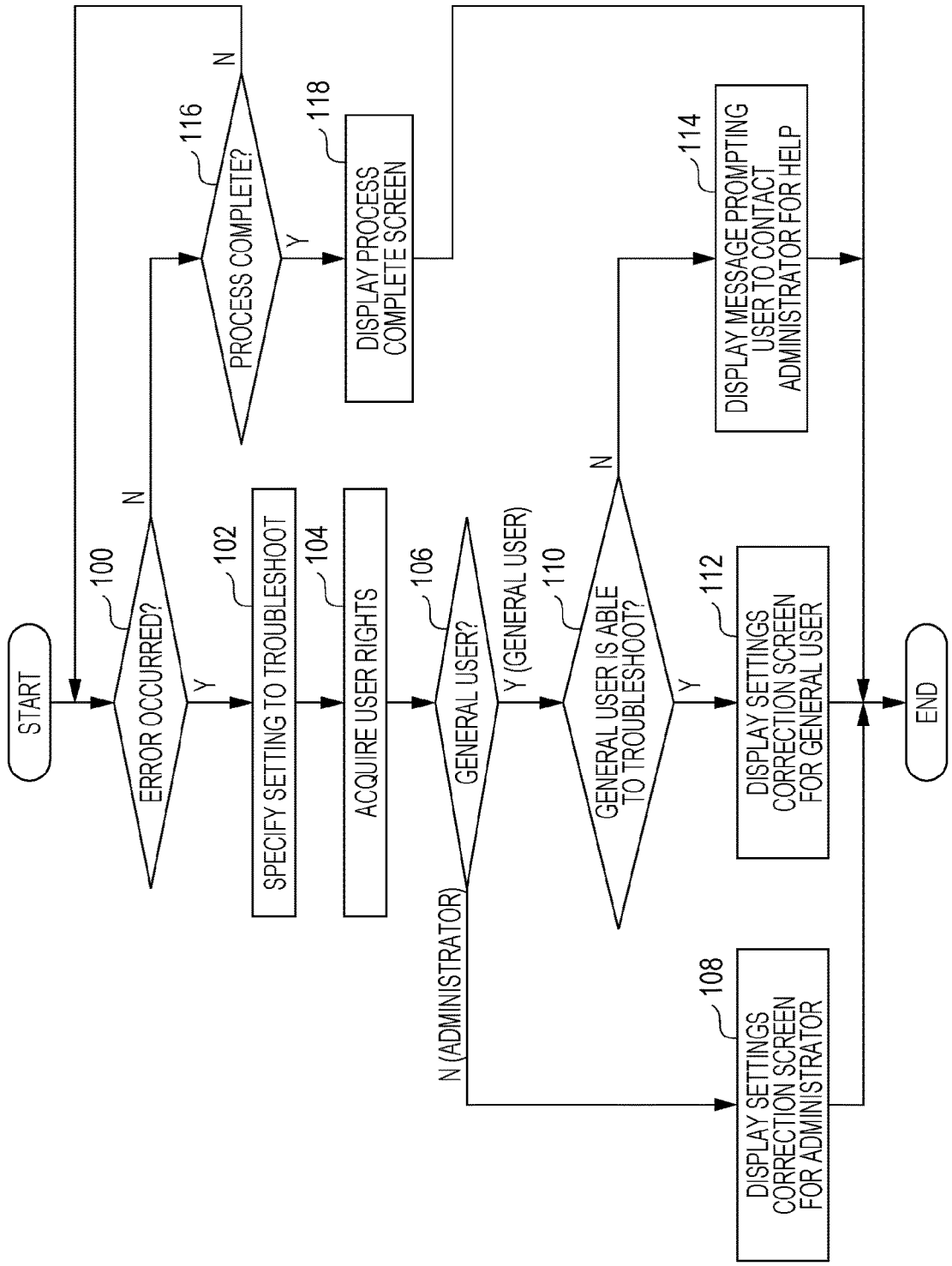
FIG. 5 is a flowchart illustrating an example of the flow of the process of a display control program according to the first exemplary embodiment.

Next, FIG. 5 will be referenced to describe the action of the image forming device 10 according to the first exemplary embodiment. Note that FIG. 5 is a flowchart illustrating an example of the flow of the process of the display control program 14A according to the first exemplary embodiment.

First, when the user instructs the image forming device 10 to start the image forwarding process, the display control program 14A is launched, and each of the following steps is executed. Note that the display control program 14A is executed repeatedly on a predetermined interval during the execution of the image forwarding process.

In step 100 of FIG. 5, the error detector 30 determines whether or not an error has occurred during the execution of the image forwarding process. In the case of determining that an error has occurred (the case of a positive determination), the flow proceeds to step 102, whereas in the case of determining that an error has not occurred (the case of a negative determination), the flow proceeds to step 116.

In step 102, the specifier 32 references the rights management table 14B illustrated in FIG. 4 as an example, on the basis of an error code obtained from log information about the image forwarding process, for example, to specify a setting to troubleshoot (in the example of FIG. 4, a troubleshooting item).

In step 104, the specifier 32 acquires the rights of the user on the basis of the user ID of the user who gave the instruction to execute the image forwarding process.

In step 106, the specifier 32 determines whether or not the user rights acquired in the above step 104 are general user rights. In the case of determining that the user rights are not general user rights, or in other words, are administrator rights (the case of a negative determination), the flow proceeds to step 108, whereas in the case of determining that the user rights are general user rights (the case of a positive determination), the flow proceeds to step 110.

In step 108, the display controller 34 causes the display 16 to display a screen for correcting settings for an administrator, as illustrated in FIG. 9 described later as an example, and the process according to the display control program 14A ends.

On the other hand, in step 110, the specifier 32 references the rights management table 14B illustrated in FIG. 4 as an example with respect to the item to troubleshoot specified in the above step 102, and determines whether or not the setting is one that a general user is able to troubleshoot. In the case of determining that the setting is one that a general user is able to troubleshoot (the case of a positive determination), the flow proceeds to step 112, whereas in the case of determining that the setting is not one that a general user is able to troubleshoot (the case of a negative determination), the flow proceeds to step 114.

In step 112, the display controller 34 causes the display 16 to display a screen for correcting settings for a general users, as illustrated in FIGS. 6 and 7 as an example, and the process according to the display control program 14A ends.

FIG. 6 is a front view illustrating an example of a confirmation screen 16A according to the present exemplary embodiment.

As illustrated in FIG. 6, on the confirmation screen 16A according to the present exemplary embodiment, a processing procedure 61 related to the image forwarding process is displayed. As an example, the processing procedure 61 includes the procedures of "connect to server", "login", "access share name", "access save location", and "forward image". Additionally, in the processing procedure 61, it is indicated that an error has occurred during the procedure marked with an "X" sign. In the example illustrated in FIG. 6, an error has occurred during the "login" procedure. In this case, the message "Check login name/password." is displayed together with confirmation items 62. The user looking at the confirmation screen 16A that includes the confirmation items 62 grasps that the "user name" and "password" are the settings to troubleshoot.

Also, on the confirmation screen 16A illustrated in FIG. 6, a Settings button 63 is displayed in a pressable state. If the user presses the Settings button 63, the display transitions to a general user settings screen 16B illustrated in FIG. 7.

FIG. 7 is a front view illustrating an example of the general user settings screen 16B according to the present exemplary embodiment.

As illustrated in FIG. 7, on the general user settings screen 16B according to the present exemplary embodiment, the current content of multiple settings, including the "user name" and "password" treated as the settings to troubleshoot on the confirmation screen 16A, is displayed. The user appropriately corrects the content of each of the user name 64 and the password 65 on the general user settings screen 16B, and then gives an instruction to start the image forwarding process again.

On the other hand, in step 114, the display controller 34 causes the display 16 to display a confirmation screen 16C including a message prompting the user to contact an administrator for help as illustrated in FIG. 8 as an example, and the process according to the display control program 14A ends.

FIG. 8 is a front view illustrating an example of a confirmation screen 16C according to the present exemplary embodiment.

As illustrated in FIG. 8, on the confirmation screen 16C according to the present exemplary embodiment, similarly to the confirmation screen 16A illustrated in FIG. 6, a processing procedure 61 related to the image forwarding process is displayed. In the example illustrated in FIG. 8, an error has occurred during the "connect to server" procedure. In this case, the message "Check DNS settings." is displayed together with a message 66 prompting the user to contact an administrator for help. The user looking at the confirmation screen 16C that includes the message 66 grasps that contacting the administrator for help troubleshooting the error is advisable, and for example, verbally asks an administrator inside the company for help troubleshooting the error that is occurring in the terminal device 10.

FIG. 9 is a front view illustrating an example of an administrator settings screen 16D according to the present exemplary embodiment.

The administrator receives a troubleshooting request from a general user, logs in to the terminal device 10, and causes the administrator settings screen 16D illustrated in FIG. 9 to be displayed. On the administrator settings screen 16D, the current content of multiple settings, including an "IPv4-DNS setting" treated as the setting to troubleshoot on the confirmation screen 16C, is displayed. The multiple settings are settings that only an administrator is able to troubleshoot. Subsequently, the administrator appropriately corrects the content of the IPv4-DNS setting on the administrator settings screen 16D, and then gives an instruction to start the image forwarding process again.

On the other hand, in step 116, the error detector 30 determines whether or not the image forwarding process has completed. In the case of determining that the image forwarding process has completed (the case of a positive determination), the flow proceeds to step 118, whereas in the case of determining that the image forwarding process has not completed (the case of a negative determination), the flow returns to step 100, and the process is repeated.

In step 118, the display controller 34 causes the display 16 to display an image forwarding process complete screen (not illustrated), and the process according to the display control program 14A ends.

In this way, according to the present exemplary embodiment, in the case in which an error occurs during the execution of the image forwarding process, a screen for correcting the setting to troubleshoot is displayed according to the rights of the user. The display of the screen makes it possible for even a general user to obtain an appropriate troubleshooting method that the user is able to troubleshoot by oneself.

Second Exemplary Embodiment

The first exemplary embodiment above describes an exemplary embodiment that displays a screen for correcting a setting to troubleshoot according to the rights of the user when an error occurs during the execution of a process by a certain image forming device. The present exemplary embodiment describes an exemplary embodiment in which, when there are multiple image forming devices, image information and information indicating a destination are forwarded from the device itself where an error has occurred to another image forming device.

Figure 10:
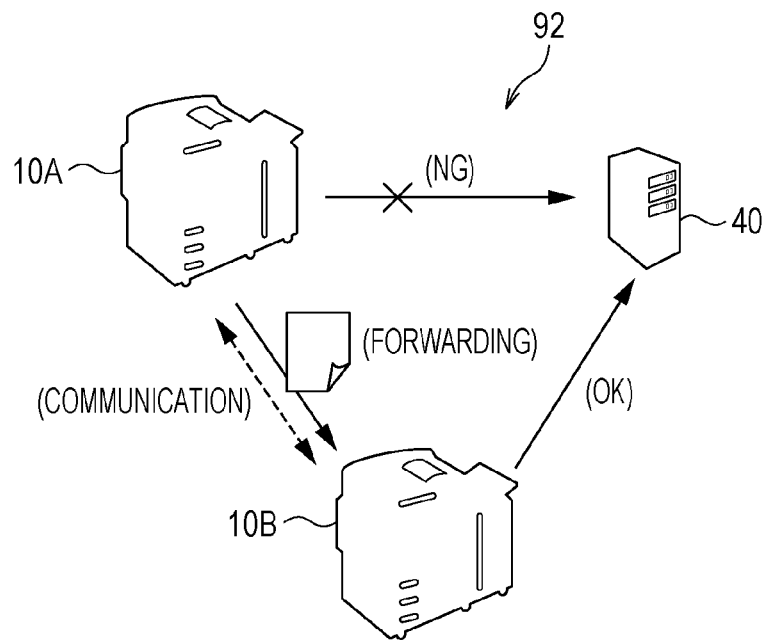
FIG. 10 is a diagram illustrating an example of a configuration of a network system according to a second exemplary embodiment.

FIG. 10 is a diagram illustrating an example of a configuration of a network system 92 according to the second exemplary embodiment.

As illustrated in FIG. 10, the network system 92 according to the present exemplary embodiment is provided with an image forming device 10A, and image forming device 10B, and a terminal device 40 used by a general user.

The present exemplary embodiment anticipates a case in which, for example, a general user sets the terminal device 40 as the destination, and an error occurs during the execution of the image forwarding process from the device itself (herein, the image forming device 10A) to the terminal device 40. In the case in which the device itself is able to communicate with the image forming device 10B and the image forming device 10B is capable of executing the image forwarding process, image information and information indicating the destination (herein, the terminal device 40) is forwarded to the image forming device 10B. The forwarding process is executed by the communication unit 24 in accordance with an instruction from the CPU 12A.

Figure 11:
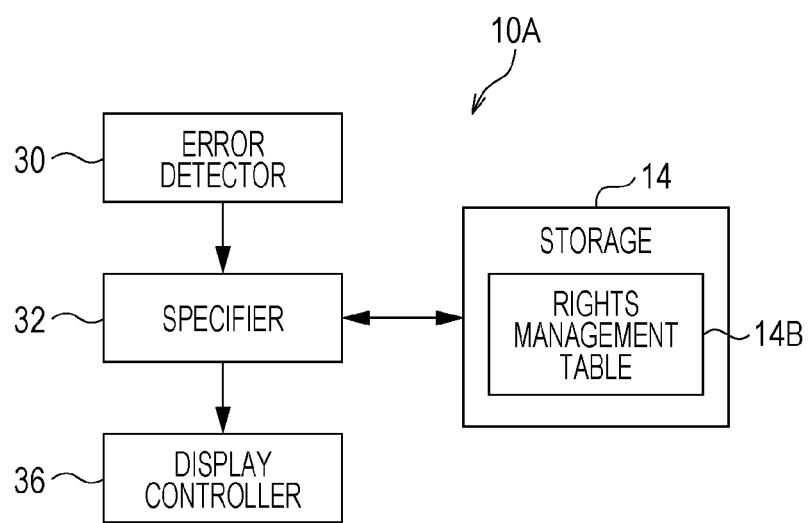
FIG. 11 is a block diagram illustrating an example of a functional configuration of an image forming device according to the second exemplary embodiment.

FIG. 11 is a block diagram illustrating an example of a functional configuration of the image forming device 10A according to the second exemplary embodiment.

As illustrated in FIG. 11, the image forming device 10A according to the present exemplary embodiment is provided with an error detector 30, a specifier 32, and a display controller 36. Note that structural elements having the same function as the image forming device 10 illustrated in the first exemplary embodiment are denoted with the same signs, and a repeated description is omitted here.

Figure 12:
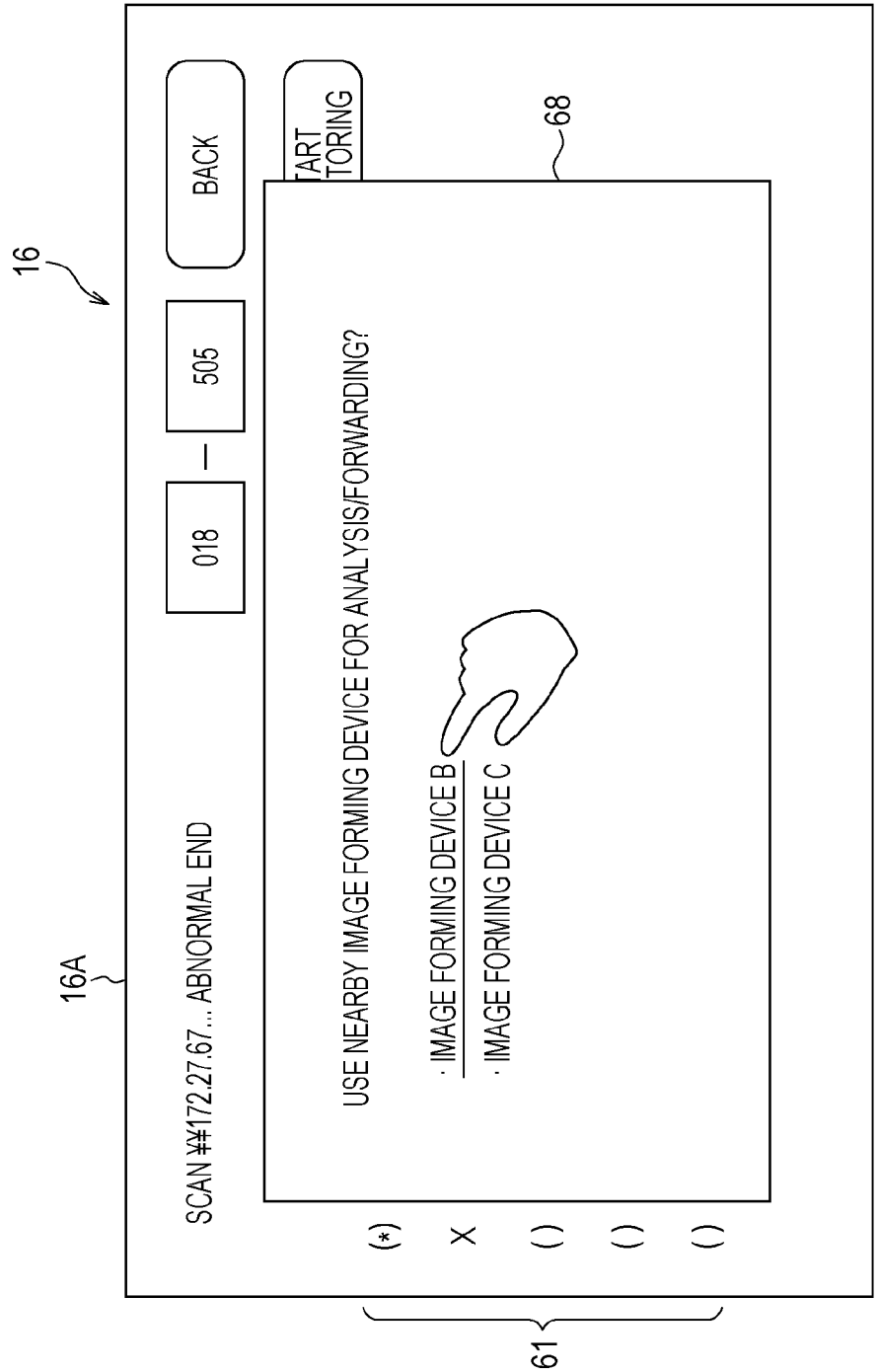
FIG. 12 is a front view illustrating an example of a confirmation screen on which a list of image forming devices available for forwarding is overlaid according to an exemplary embodiment.

When the occurrence of an error is detected, the display controller 36 according to the present exemplary embodiment causes the display 16 to display the confirmation screen 16A illustrated in FIG. 6 as an example, and then additionally causes a list of image forming devices available for forwarding to be overlaid onto the confirmation screen 16A, as illustrated in FIG. 12.

FIG. 12 is a front view illustrating an example of the confirmation screen 16A on which a list 68 of image forming devices available for forwarding is overlaid according to the present exemplary embodiment.

In the example of the screen illustrated in FIG. 12, the list 68 of image forming devices available for forwarding is displayed overlaid onto the confirmation screen 16A illustrated in FIG. 6.

In the present exemplary embodiment, in the case in which an image forming device (herein, the image forming device 10B) is selected by the user from the list 68 illustrated in FIG. 12, the device itself forwards destination information from the device itself to the image forming device 10B as described above, and causes test data to be transmitted from the image forming device 10B to the terminal device 40 specified by the forwarded destination information. The result of the transmission of the test data is reported in a notification from the image forming device 10B to the device itself. Subsequently, on the basis of the reported transmission result, in the case in which the test data has been transmitted successfully, the device itself determines that the image forming device 10B is capable of executing the image forwarding process. In this case, instead of the list 68 of image forming devices available for forwarding illustrated in FIG. 12, the display controller 34 causes a list of executable processes to be displayed overlaid onto the confirmation screen 16A, as illustrated in FIG. 13.

Figure 13:
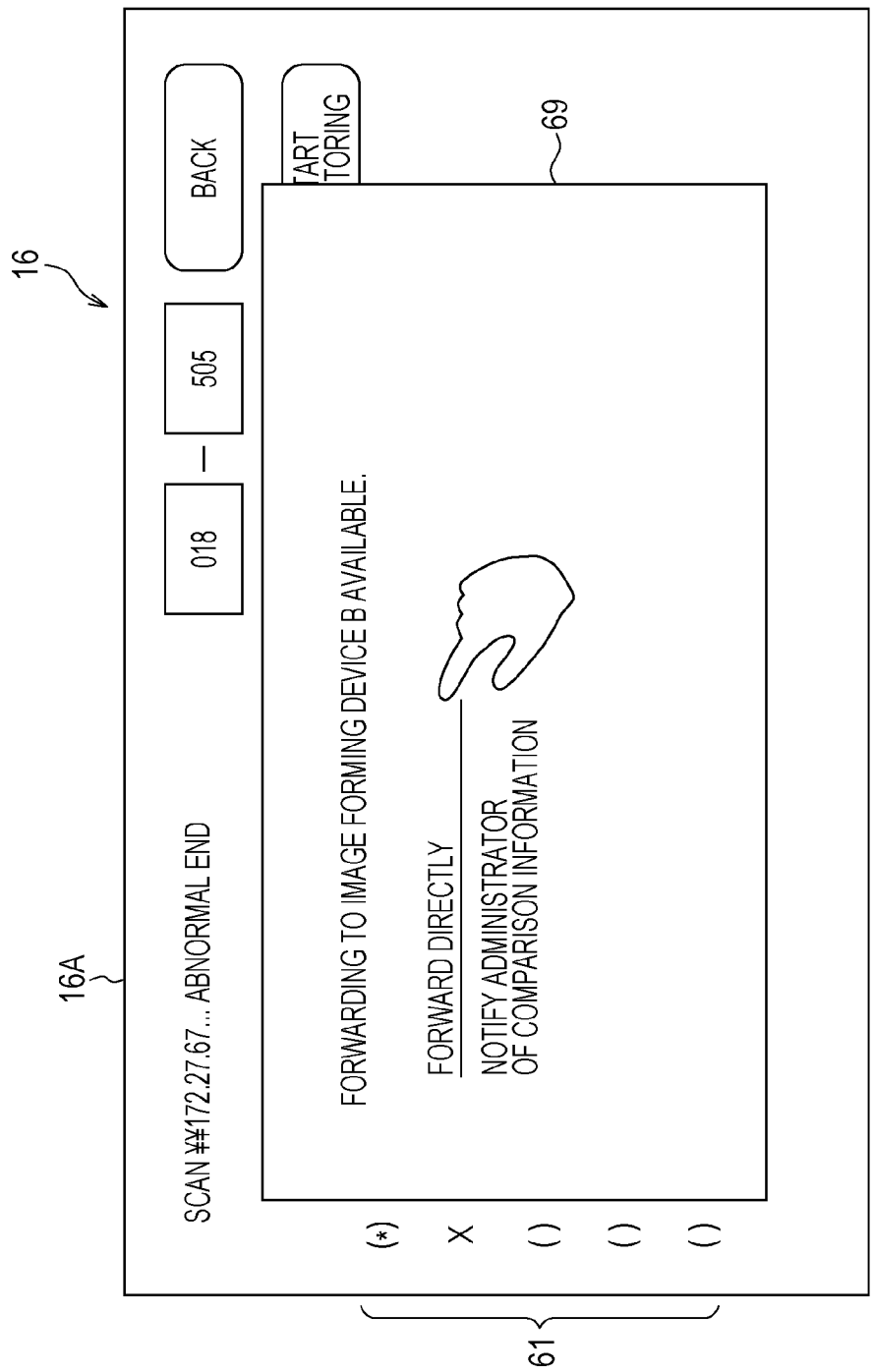
FIG. 13 is a front view illustrating an example of a confirmation screen on which a list of executable processes is overlaid according to an exemplary embodiment.

FIG. 13 is a front view illustrating an example of the confirmation screen 16A on which a list 69 of executable processes is overlaid according to the present exemplary embodiment.

In the example of the screen illustrated in FIG. 13, a message indicating that the image forming device (herein, the image forming device 10B) selected by the user is available for forwarding, as well as a list 69 of executable processes, are displayed overlaid onto the confirmation screen 16A illustrated in FIG. 6.

The list 69 illustrated in FIG. 13 includes "Forward directly" and "Notify administrator of comparison information" as the executable processes. In the case in which "Forward directly" is selected by the user, the image information forwarded from the device itself to the image forming device 10B is forwarded directly from the image forming device 10B to the terminal device 40. On the other hand, in the case in which "Notify administrator of comparison information" is selected by the user, only a comparison of the content of settings between the image forming devices is executed, and the administrator is notified of comparison information indicating the comparison result.

In this way, according to the present exemplary embodiment, when there are multiple image forming devices, image information and information indicating a destination are forwarded from the device itself where an error has occurred to another image forming device. By this forwarding, for example, it becomes possible to execute the image forwarding process using the other image forming device.

The above description takes an image forming device as one example of an information processing device as an exemplary embodiment. An exemplary embodiment may also be configured as a program that causes a computer to execute the functions of each component provided in the information processing device. An exemplary embodiment may also be configured as a computer-readable storage medium storing the program.

Otherwise, the configuration of the information processing device described in the exemplary embodiments above is an example, and may be modified according to circumstances within a range that does not depart from the gist.

Also, the process flow of the program described in the exemplary embodiments above is an example, and unnecessary steps may be removed, new steps may be added, or the processing sequence may be rearranged within a range that does not depart from the gist.

Also, the exemplary embodiments above describe a case in which the process according to the exemplary embodiments is realized by a software configuration using a computer by executing a program, but the configuration is not limited thereto. The exemplary embodiments may also be realized by a hardware configuration, or by a combination of a hardware configuration and a software configuration, for example.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing device comprising:
   a controller that causes a display to display a screen for correcting a setting to troubleshoot according to a right of a user when a predetermined process to be executed fails; and
   storage that stores correspondence relationship information indicating a correspondence relationship between the right of the user and the setting to troubleshoot, wherein
   the controller causes the display to display the screen in accordance with the correspondence relationship information stored in the storage.

2. The information processing device according to claim 1, wherein
   the setting to troubleshoot s one of a plurality of settings to troubleshoot, and
   in a case in which the plurality of settings to troubleshoot exist, the controller causes the display to prioritize the display of a setting having a high probability of addressing the failure as the setting to troubleshoot, on a basis of history information related to the failure of the predetermined process.

3. The information processing device according to claim 1, wherein
   the controller causes the display to display the screen for correcting a setting determined by log information about the predetermined process.

4. The information processing device according to claim 1, wherein
   in a case in which the device itself and an other information processing device are able to communicate, the controller causes the display to display the screen for correcting a setting whose content is different between the device itself and the other information processing device.

5. The information processing device according to claim 4, wherein
   in a case in which the device itself and the other information processing device are able to communicate, and the other information processing device is capable of executing the predetermined process, the controller causes the display to display the screen for correcting a setting whose content is different between the device itself and the other information processing device.

6. The information processing device according to claim 1, wherein
   in a case in which the setting to troubleshoot is a setting troubleshooted by an administrator of the device itself, the controller causes the display to additionally display a message prompting the user to contact the administrator for help.

7. The information processing device according to claim 1, further comprising:
   a reader that reads a document to obtain image information; and
   a forwarder that forwards the image information to a destination specified in advance, wherein
   the predetermined process is a process of forwarding the image information to the destination specified in advance.

8. The information processing device according to claim 7, wherein
   in a case in which the device itself and the other information processing device are able to communicate, and the other information processing device is capable of executing the predetermined process, the forwarder forwards the image information and information indicating the destination to the other information processing device.

9. A non-transitory computer readable medium storing a program causing a computer to execute a process for processing information, the process comprising:
   causing a display to display a screen for correcting a setting to troubleshoot according to a right of a user when a predetermined process to be executed fails_;
   causing a storage to store correspondence relationship information indicating a correspondence relationship between the right of the user and the setting to troubleshoot; and
   causing the display to display the screen in accordance with the correspondence relationship information stored in the storage.

10. An information processing method comprising:
    controlling a display to display a screen for correcting a setting to troubleshoot according to a right of a user when a predetermined process to be executed fails;

storing in a storage to store correspondence relationship information indicating a correspondence relationship between the right of the user and the setting to troubleshoot; and controlling the display to display the screen in accordance with the correspondence relationship information stored in the storage.

\* \* \* \* \*